July 13, 1965 F. J. ALTMAN ETAL 3,195,049

RADIO DIVERSITY RECEIVING SYSTEM WITH AUTOMATIC PHASE CONTROL

Filed May 4, 1960 5 Sheets-Sheet 1

INVENTORS.
FREDERICK J. ALTMAN
ALEX T. BROWN, III
BY Alfred C. Hill
AGENT

RADIO DIVERSITY RECEIVING SYSTEM WITH AUTOMATIC PHASE CONTROL

Filed May 4, 1960

5 Sheets-Sheet 2

INVENTORS.
FREDERICK J. ALTMAN
ALEX T. BROWN, III
BY Alfred C. Hill
AGENT

RADIO DIVERSITY RECEIVING SYSTEM WITH AUTOMATIC PHASE CONTROL

Filed May 4, 1960

INVENTORS.
FREDERICK J. ALTMAN
ALEX T. BROWN III
BY Alfred C. Hill
AGENT

RADIO DIVERSITY RECEIVING SYSTEM WITH AUTOMATIC PHASE CONTROL

Filed May 4, 1960 5 Sheets-Sheet 4

INVENTORS.
FREDERICK J. ALTMAN
ALEX T. BROWN III
BY Alfred C. Hill
AGENT

RADIO DIVERSITY RECEIVING SYSTEM WITH AUTOMATIC PHASE CONTROL

Filed May 4, 1960

INVENTORS.
FREDERICK J. ALTMAN
ALEX T. BROWN III
BY Alfred C. Hill
AGENT

United States Patent Office 3,195,049
Patented July 13, 1965

3,195,049

RADIO DIVERSITY RECEIVING SYSTEM WITH AUTOMATIC PHASE CONTROL

Frederick J. Altman, Ridgewood, and Alex T. Brown III, Wayne, N.J., assignors to International Telephone and Telegraph Corporation, Nutley, N.J., a corporation of Maryland Filed May 4, 1960, Ser. No. 26,817
29 Claims. (Cl. 325—305)

Figure 1:
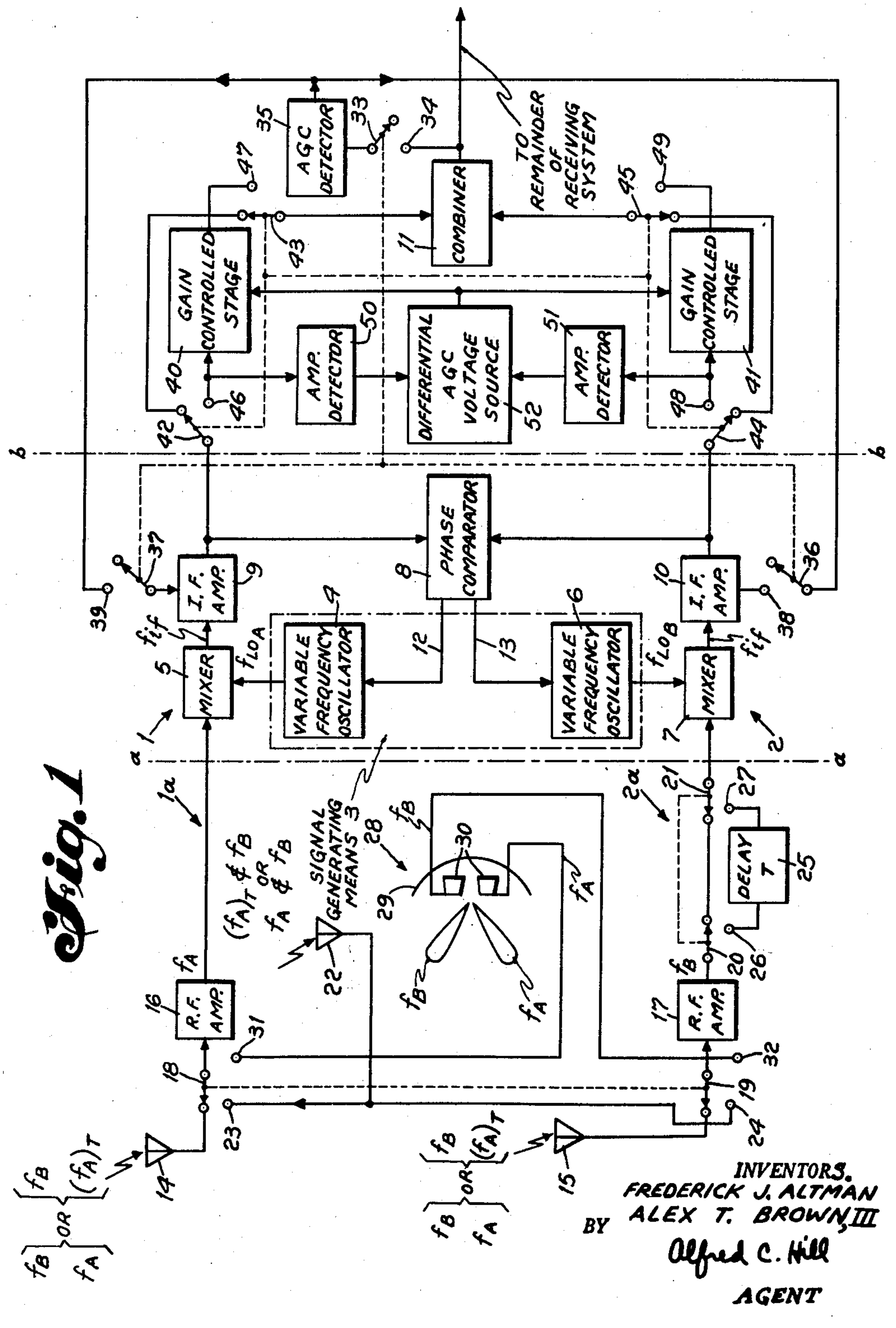

This invention relates to radio diversity receiving systems and more particularly to space, frequency, time and angle diversity radio reception of angularly modulated carrier waves, such as for example, frequency or phase modulated carrier waves. This is a continuation-in-part of our copending application, Serial No. 719,181, filed February 27, 1958, now abandoned, which in turn was a continuation-in-part of our then copending application, Serial No. 535,874, filed September 22, 1955, now abandoned.

One of the difficulties encountered in long distance radio systems is that of fading, generally regarded as resulting from the interference at the receiving system between those transmitted radio waves which have followed paths of different effective lengths. Heretofore, this fading difficulty has been attacked by various forms of diversity systems.

One such diversity system is known as space diversity. In space diversity receiving systems, in general, two or more separate antennas are spaced far enough apart at the receiving station to yield signals having different fading characteristics, that is, the signals have an envelope correlation coefficient of less than 0.6 and fade substantially independent of each other. The signal correlation coefficient is based on a scale of 0 to 1, where 0 represents two variables, the received signals in this instance, that are uncorrelated and 1 represents two variables that are completely correlated. Each antenna is then associated with a corresponding signal channel. Automatic gain control voltages may be used to control the gain of all of the signal channels. In previously employed arrangements for combining the channel signals, the output signal from the demodulator stage in each signal channel is fed into a common circuit to be combined therein. This common circuit thus provides a single combined signal at baseband, that is, a single intelligence signal.

Another diversity arrangement is known as frequency diversity. In frequency diversity systems, in general, two or more carrier frequency signals are spaced far enough apart such that their fading characteristics are substantially uncorrelated, that is, the signals have an envelope correlation coefficient of less than 0.6 and fade substantially independent of each other. Each of the frequency signals are coupled to a corresponding signal channel responsive to the frequency of the frequency spaced signals. Common automatic gain control may again be employed to control the gain of all the signal channels. In previous signal combining arrangements, the demodulated output from each signal channel is fed to a common circuit to produce a single combined signal at baseband.

Still another diversity arrangement is known as time diversity. In time diversity systems, in general, the signals are delayed in time with respect to each other at the transmitter to provide signals having an envelope correlation coefficient of less than 0.6. Each of the received signals is applied to corresponding signal channels including means to delay the received signals in time with respect to each other to return the received signals to their original time coincident relationship. The received signals would then be operated upon in the manner described hereinabove with respect to the space and frequency diversity techniques to obtain a single combined signal at baseband.

Still a further diversity arrangement is known as angle diversity. In angle diversity systems, in general, each radiation beam of a multibeam antenna is energized by the same intelligence modulating a carrier frequency either at the same frequency or at different frequencies to provide signals having an envelope correlation coefficient of less than 0.6 so that the signals fade substantially independent of each other. The plurality of radiation beams may be provided at the transmitter or receiver end of the communication link, or at both ends of the communication link. The received signals are segregated to their appropriate signal channel in the receiving system. The signals present in each signal channel may then be operated upon as described hereinabove with respect to the other diversity techniques to obtain a single combined signal at baseband.

In receiving frequency or similarly modulated signals, it is desirable and usual, in practice, to limit the signal amplitude prior to the demodulation stage. If such an amplitude limiting is embodied in each of the signal channels of a space, frequency, time or angular diversity receiving system for frequency modulated (FM) waves, it is possible for a single channel, having a weak signal compared to the noise therein, to contribute a substantially large noise volume to the combined signal output. In other words, any amplitude limiting in the signal channel or channels having the largest amplitude signal tends to exaggerate the effect of noise from the remaining channel or channels. Various devices and arrangements have been suggested to insure more effective diversity reception of FM waves. Some of these suggestions provide effective results under certain special conditions but tend to require complicated equipment and other such suggestions fail to provide, in practice, any desirable results. Thus, previous communication systems employing diversity techniques have been primarily limited to amplitude modulated signals. However, with the introduction of tropospheric scatter systems, it becomes obvious that it would be desirable to employ modulation techniques inherently providing a signal-to-noise enhancement, such as is obtainable with FM techniques, in conjunction with diversity techniques.

Therefore, one of the objects of this invention is to provide a diversity receiving system for combining substantially inphase a plurality of FM signals without the exaggeration of noise resulting from amplitude limiting.

Another object of this invention is to provide a diversity receiving system for combining substantially inphase a plurality of signals derived from the heterodyning of other signals.

Still another object of this invention is to provide an automatic phase control system to maintain a predetermined phase relationship between a plurality of signals having the same (IF) intermediate frequency.

A further object of this invention is to combine substantially inphase the outputs of a plurality of heterodyning circuits by adjusting the phase of the oscillatory signal coupled to at least one of the heterodyne circuits.

Still a further object of this invention is to provide a means to control the ratio of the amplitude of the received signals to have a predetermined amplitude ratio at the signal combining point.

A feature of this invention is the provision of an automatic phase control system including a plurality of signal channels each responsive to an associated one of a plurality of signals having random phase relation with respect to each other. Each of the signal channels includes a heterodyne means operable in conjunction with an oscillatory signal produced by a signal generating means to convert the associated one of the plurality of signals to IF signal at the output thereof. The oscillatory signals associated with each of the signal channels cooperate to provide an IF signal in each of the signal channels having the same frequency, that is, the same center or carrier frequency and the same modulating frequency. A phase control means is coupled to the output of each of the heterodyne means and the signal generating means to adjust the phase of at least one of the oscillatory signals to vary the phase relation of the IF signals with respect to each other to maintain the IF signals in a predetermined phase relationship for substantially inphase combining thereof at the IF signal combining point.

Another feature of this invention is the provision of the phase control means including a phase comparison means coupled to predetermined ones of the heterodyne means. The phase comparison means is also coupled to a source of reference signals including the IF signal of selected ones of the signal channels to produce a control signal proportional to the phase relation between the IF signal of the predetermined ones of the heterodyne means and the reference signal. The control signal is then coupled to the signal generating means to adjust the phase of the oscillatory signal coupled to at least the predetermined ones of the heterodyne means to maintain a predetermined phase relationship between the IF signals for substantially inphase combining thereof at the IF signal combining point.

Still another feature of this invention is the provision of the phase comparison means including a phase comparator coupled to the output of a pair of heterodyne means to produce a control signal proportional to the phase relation between the two IF signals, one of the IF signals being the reference signal for the other of the IF signal. The control signal is then coupled to the signal generating means to vary the phase of at least one of the oscillatory signals coupled to one of the pair of heterodyne means relative to the other of the oscillatory signals coupled to the other of the pair of heterodyne means to maintain the IF signals in a predetermined phase relationship for substantially inphase combining thereof at the IF signal combining point.

A further feature of this invention is the provision of the phase comparison means including a plurality of phase comparators each being coupled to the output of one of the heterodyne means and also in common to all of the heterodyne means to produce a control signal proportional to the phase relation between the associated IF signal and the combined IF signals, the combined IF signals being the reference signal for the individual IF signals. The control signal of each of the phase comparators is coupled to the signal generating means to vary the phase of the associated oscillatory signal to maintain the IF signals in a predetermined phase relationship for substantially inphase combining thereof at the IF signal combining point.

Still a further feature of this invention is the provision of a diversity receiving system of the signal combining type incorporating the phase control system of this invention and an automatic gain control arrangement to control the ratio of the amplitude of the signals applied to the input of the signal channels in accordance with a predetermined relationship prior to the combining of the IF signals. The automatic gain control arrangement can render the ratio of the amplitude of the IF signals at the combiner equal to the ratio of the amplitude of the signals applied to the input of the signal channels to provide linear combining of the IF signals in the combiner, or the ratio of the amplitude of the signals applied to the input of the signal channels may be predeterminedly modified to provide, for instance, ratio squared combining of the IF signals in the combiner.

Other features of this invention include various forms of signal generating means upon which the phase control means can operate to provide the desired phase relationship between the IF signals for substantially inphase combining at the IF signal combining point. The signal generating means may include a variable frequency oscillator having its output coupled to one signal channel and a fixed frequency oscillator having its oscillatory signal coupled to the other channel of a dual diversity receiving system. The phase control signal is then applied to the variable frequency oscillator to maintain the desired phase relation between the IF signals. Another signal generating means arrangement includes a plurality of variable frequency oscillators having their respective oscillatory signals coupled to their associated signal channels and phase control signals are applied, in certain configurations, in push-pull relation and in other configurations independent of one another, to each of the variable frequency oscillators to maintain the desired phase relation between the IF signals. A third configuration of the signal generating means includes a single oscillator and a plurality of phase modulators each coupling the oscillatory signal of the oscillator to associated ones of the signal channels and the phase control signal is applied to each of the phase modulators to maintain the desired phase relation between the IF signals.

Still other features of this invention is the provision of the signal combining system of this invention having the signal channels thereof coupled to the spaced antennas of a space diversity receiving system, the frequency sensitive signal channels of a frequency diversity system, the signal channels of a time diversity system, one of said time diversity signal channels including a time delay device therein to adjust the signals for time coincidence, or the beam energy receiving means in an angle diversity receiving system.

Figures 2, 4:
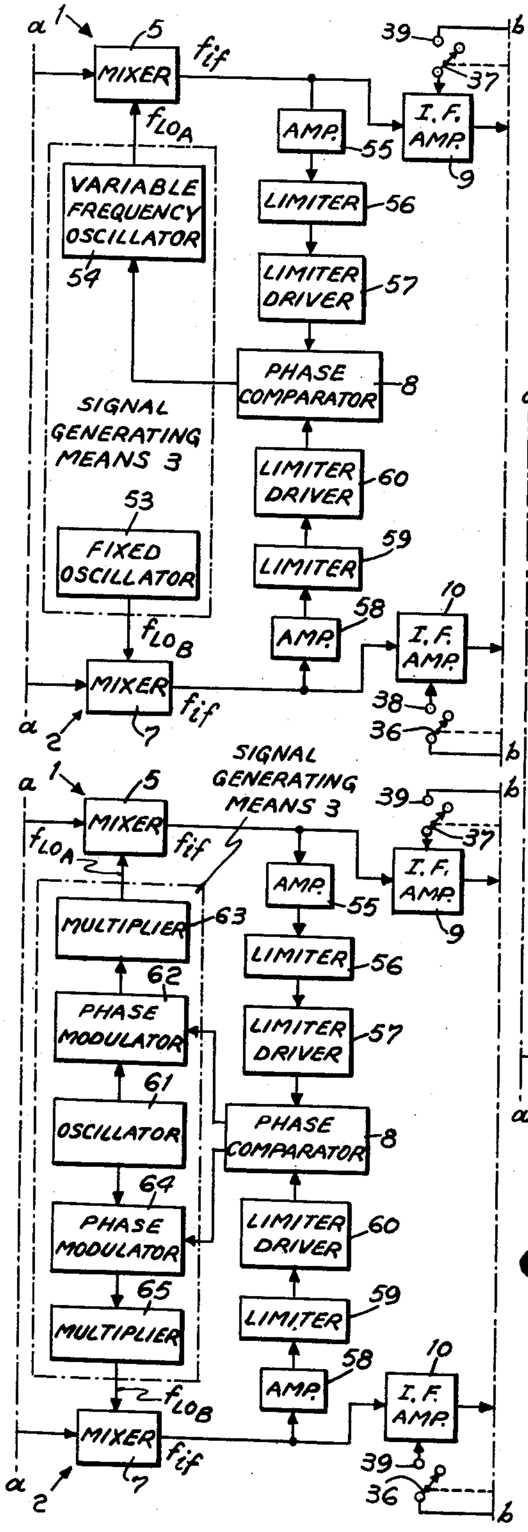
Figure 3:
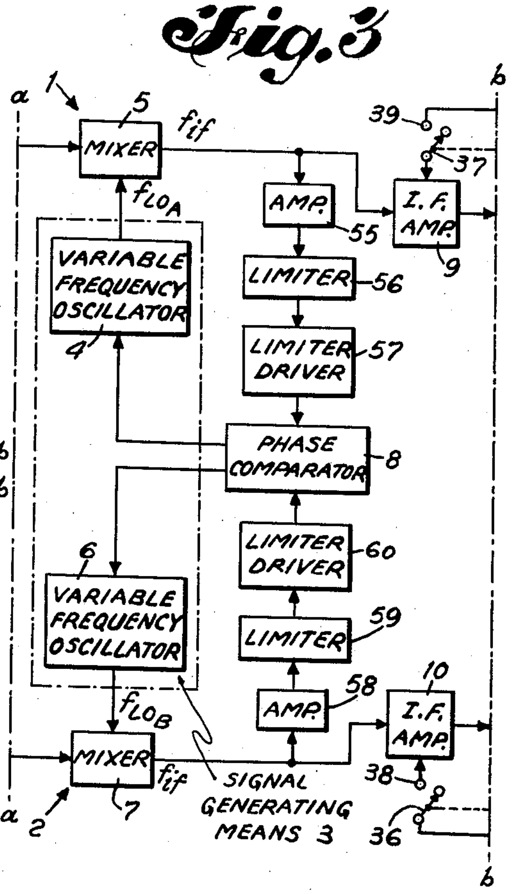
Figure 5:
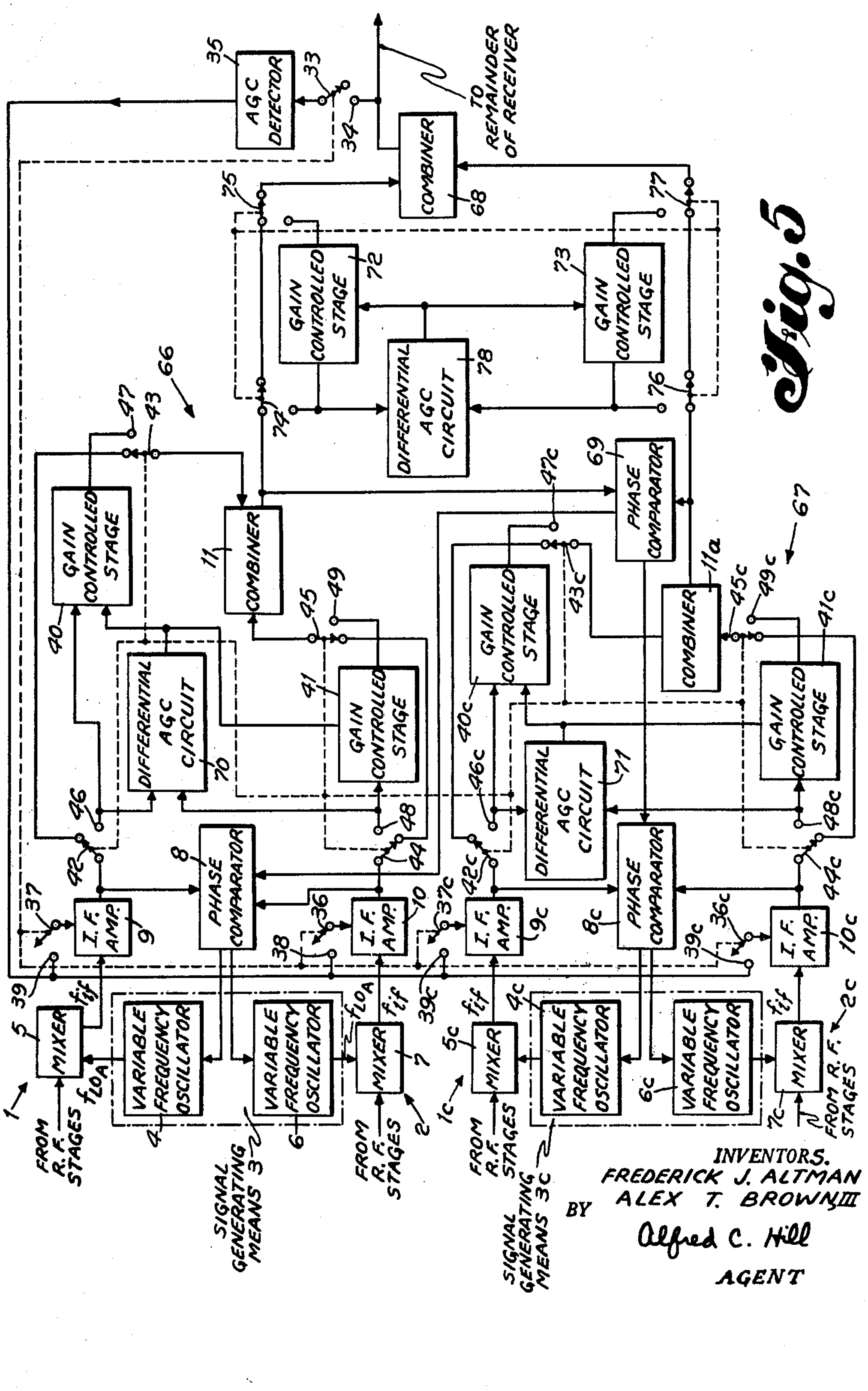
Figure 6:
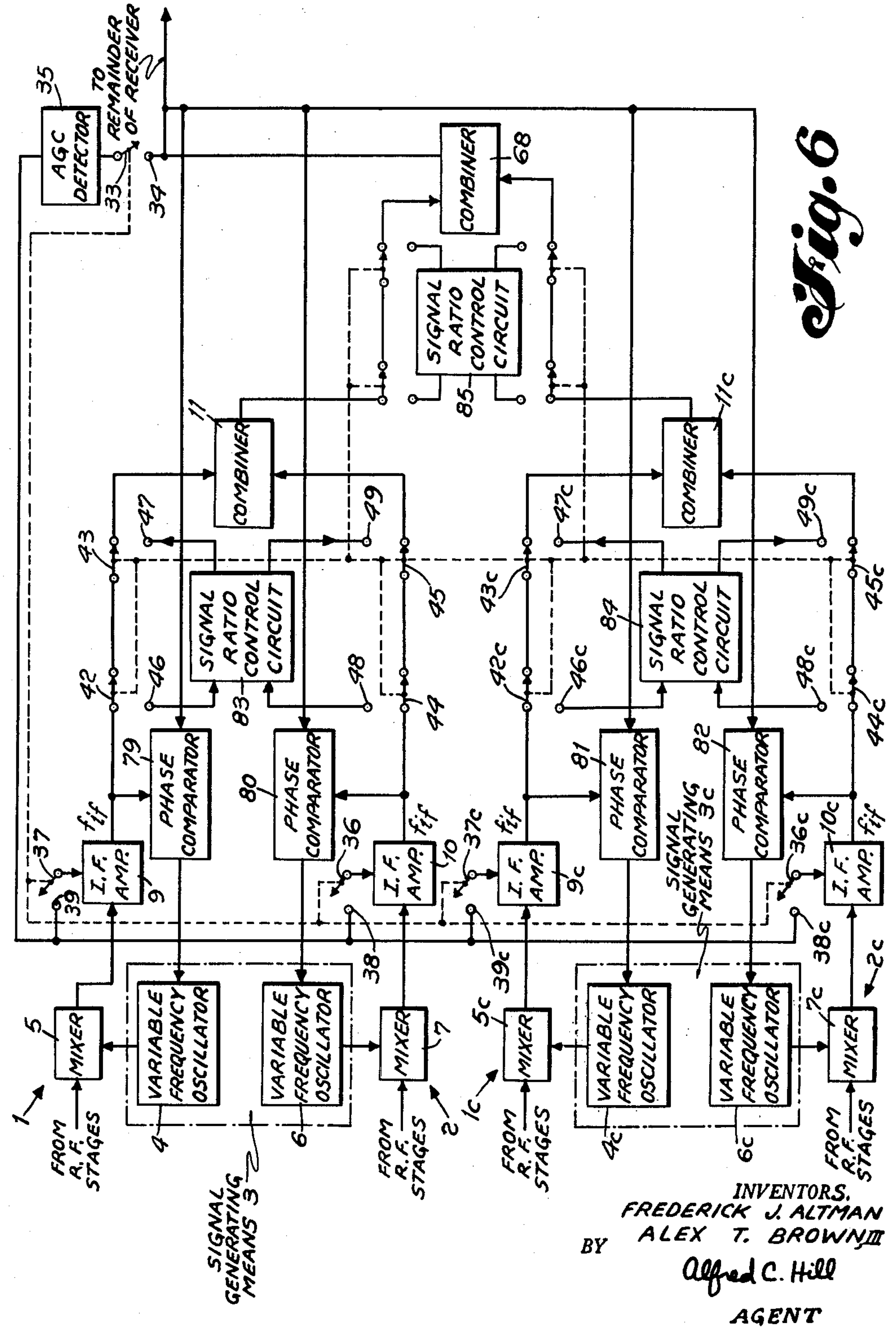
Figure 7:
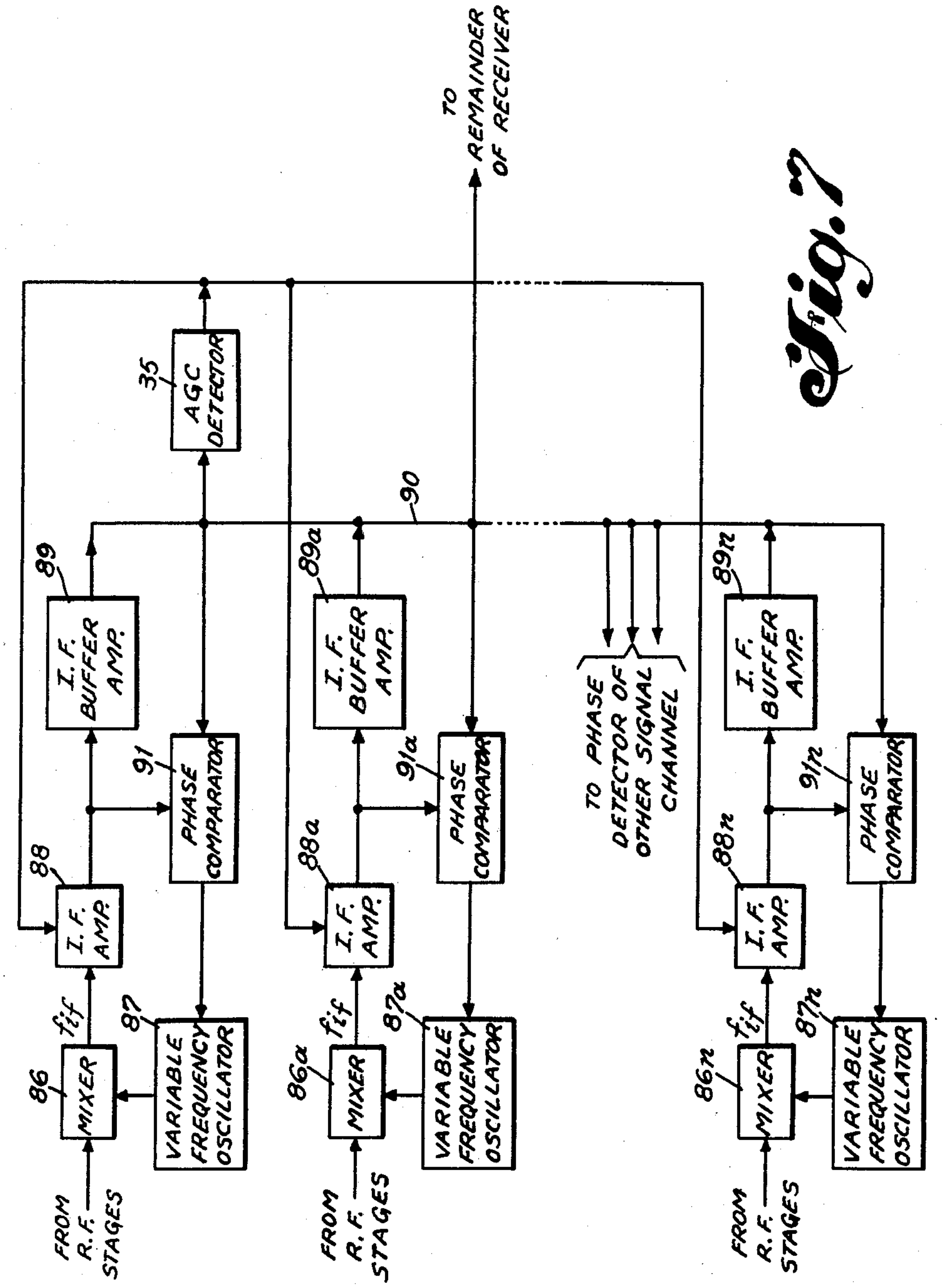

The above-mentioned and other features and objects of this invention will become more apparent by reference to the following description taken in conjunction with the accompanying drawings, in which:

FIG. 1 is a schematic diagram in block form illustrating various diversity receiving systems following the principles of this invention;

FIGS. 2, 3 and 4 are schematic diagrams in block diagram form of alternative automatic phase control arrangements which may be substituted for the automatic phase control arrangement between lines *a—a* and *b—b* of FIG. 1; and FIGS. 5, 6 and 7 are schematic diagrams in block diagram form of other embodiments of the signal combining arrangement illustrating still other embodiments of the phase control system following the principles of this invention.

Referring to FIG. 1, various diversity receiving systems are illustrated in block diagram form incorporating the signal combining arrangement in accordance with the principles of this invention. The signal combining arrangement comprises an automatic phase control system including a plurality of signal channels each coupled to respective ones of a plurality of signal sources, such as signal channel 1 coupled to signal source 1*a* and signal channel 2 coupled to signal source 2*a*. The signals of each of these plurality of sources 1*a* and 2*a* have been subjected to different phase changes, these phase changes being random relative to each other and to the original signals, such as may have been transmitted from a distant transmitter. Each of signal channels 1 and 2 includes a heterodyne means coupled to the associated one of sources 1*a* and 2*a* and at least a portion of a signal generating means to supply an oscillatory signal to the heterodyne means to convert the signal of the sources 1*a* and 2*a* to an IF signal. More specific, signal generating means 3 includes a variable frequency oscillator 4 to provide an oscillatory signal for a heterodyne means, such as mixer 5, included in signal channel 1 and coupled to source 1*a* and a variable frequency oscillator 6 to provide an oscillatory signal for a heterodyne means, such as mixer 7, included in signal channel 2 and coupled to source 2a.

Variable frequency oscillators 4 and 6 may comprise the usual reactance tube oscillator wherein a control signal coupled to the grid of the reactance tube varies the reactance of the tube across an oscillator to vary the frequency output thereof. Another possible configuration for oscillators 4 and 6 includes an oscillator having its control grid grounded with reference to relatively high frequency alternating signals but responsive to a direct current or relatively low frequency alternating control signals to vary the frequency output of the oscillator.

A requirement in the operation of the signal combining system of this invention is that the signals to be combined must have the same frequency to enable phase adjustment thereof and the combining of the signals applied to the combiner. Thus, regardless of the frequency of the signals applied to mixers 5 and 7 from sources 1a and 2a the oscillatory signals of signal generating means 3 must provide at the output of mixers 5 and 7, IF signals having the same frequency. This of course, may be accomplished by proper adjustment of the frequency of the oscillatory signals of oscillators 4 and 6. It, therefore, may be stated that the phase control system of the signal combining arrangement of this invention will function to adjust the phase of the IF output signals of mixers 5 and 7 to be in a predetermined phase relationship with respect to each other if the following relation is met:

$$|f_A - f_{LO_A}| = |f_B - f_{LO_B}| = |f_{if}|$$

The phase control system of the signal combining arrangement in accordance with the principles of this invention includes a phase control means, such as phase comparator 8 coupled to the output of mixers 5 and 7, either directly or through IF amplifiers 9 and 10, respectively, as illustrated, to produce a control signal proportional to the phase relation between the IF output signals of mixers 5 and 7, one of the IF signals being a reference signal for the other of the IF signals. The resultant control signal is coupled to signal generating means 3 to adjust the phase of at least one of the oscillatory signals relative to the other of the oscillatory signals to vary the phase relation of the IF output signals of mixers 5 and 7 with respect to each other to maintain a predetermined phase relationship therebetween for substantially inphase combining in combiner 11. The signals combined inphase in combiner 11 provide a single output signal representing the sum of the magnitude of the IF signals applied to combiner 11 from mixers 5 and 7 substantially overcoming the adverse effects of fading. The single output signal having a frequency equal to the IF signals may then be coupled to the remainder of the receiving system for demodulation to recover the intelligence carried thereby, or for combining with another signal derived from the combining of other received signals in a manner similar to that described hereinabove.

Phase comparator 8 must be designed to be compatible with the type of circuit incorporated in combiner 11. Basically, phase comparator 8, which may be a balanced modulator, must produce a zero voltage or control signal output when the IF signals of the signal channels 1 and 2 are combined inphase in combiner 11 and a positive or negative voltage or control signal having a magnitude dependent upon the relative phase relation between the IF signals of the signal channels applied to combiner 11. The control signal output of phase comparator 8 is illustrated to be coupled, for example, in a push-pull relation to oscillators 4 and 6 of signal generating means 3 in such a manner that when the control signal applied over conductor 12 has a positive polarity, the control signal coupled over conductor 13 has a negative polarity. Through such an arrangement, the oscillatory signals of oscillators 4 and 6 are phase adjusted by having each oscillatory signal traverse one half of the excursion necessary to correct the phase relationship between the IF signals at the output of mixers 5 and 7 to maintain these signals in the predetermined phase relationship to enable substantially inphase combining in combiner 11. It is to be understood that the push-pull control of oscillators 4 and 6 is only one of the many ways in which the phase of the IF signals may be maintained in the desired phase relationship. Certain of the alternative techniques that may be utilized for the desired phase control of the IF signals are illustrated in other ones of the figures of the drawings. Other alternatives will become apparent to those skilled in the art, certain ones of which will depend on the relation between the oscillatory signal frequency and the channel signal frequency.

The diversity receiving system described hereinabove employs signal channels equal in number to the diversity signals being received and provides after combining a single signal in the IF range having diversity advantage. The single combined signal may be fed to a common receiver portion including the usual amplitude limiters and demodulation circuitry for recovery of the intelligence conveyed by the FM modulation of the diversity signals. Thus, since the amplitude limiters operate on the combined signal the noise exaggeration of the prior art arrangement is eliminated. Another advantage of combining diversity signals in the IF range is the reduction in the amount of equipment required in the receiving system since the equipment from the output of combiner 11 to the utilization device of a FM receiver system is used in common by a plurality of signal channels. The economic saving accruing when employing this system is immediately apparent when it is recognized that, while in FIG. 1 we have illustrated only two signal channels, the same technique may be employed to provide a single signal for amplitude limiting and demodulation where there are many more signal channels, or folds of diversity, which may number twenty-eight or more. Still another advantage is realized in employing the receiving system of this invention when the diversity signals are required to be coupled through a repeater station since there is no demodulation and remodulation of the received signals. The combining of the received signals at IF eliminates demodulation and remodulation in a repeater station and, hence, the elimination of distortion that accompanies such a demodulation and remodulation. Further, the equipment necessary to carry out the demodulation and remodulation is also eliminated. A further advantage accrues from the combining the signal at IF, namely, there is provided a decrease in receiver threshold which enables receiving signals having a lower signal-to-noise ratio. This enables an improvement in signal reception and, for instance, would decrease the telegraph error rate. It has been found by employing linear addition of the IF signals coupled to combiner 11, that is, before demodulation, there is realized a threshold advantage of 3 db (decibels) for two diversity signals and a 30 db advantage for a diversity system employing 28 diversity signals.

It is preferred, as described hereinabove, to adjust the phase of the signals being combined to maintain the signals being combined in a predetermined phase relationship by adjusting the frequency of the oscillatory signals delivered by oscillators 4 and 6. The preference for frequency adjusting of the oscillatory output for phase control of the phase relationship of the IF output signals of mixers 5 and 7 is due to the fact that frequency control for phase adjustment has a greater control range than can be achieved by controlling the phase through means of a phase shifter. Frequency control for phase adjustment to obtain a phase-lock between two signals is a continuously operating arrangement and can compensate for many revolutions of radio frequency (RF) phase variations between the signals being phase controlled. For instance, it has been observed that at 1,000 mc., there can be 1,000 revolutions of RF phase difference between the signals being combined in a 200 miles forward scatter link. This large phase difference is caused by the scatter volume movements which change the phase between the signals being received in the diversity system. The worst observed condition of phase relationship for which the phase control circuit of this invention has brought about a phase-lock was 30,000 revolutions of RF phase difference at the same operating frequency and over the same length of communication link. Thus, the frequency following technique of this invention minimizes multipath distortion in the receiver because of a flywheel effect which tends to follow only one component of a multipath signal. To achieve a phase-lock under the above conditions by merely phase shifting the oscillatory outputs of oscillators 4 and 6, it would be necessary to employ a tandem arrangement of phase shift elements to achieve the desired phase-lock since each phase shift element can phase shift a signal a maximum value of only approximately 180 degrees. Hence, under control of the phase control signal the first phase shifter would shift the oscillatory signal at the output of signal generating means 3 an amount up to 180 degrees, the next phase shifter would shift the output of the first phase shifter an amount up to 180 degrees, and so forth until the desired phase control is achieved. It should be pointed out at this point that to achieve the maximum phase shift a non-linearity exists between the phase control signal and the shift of phase accomplished. Thus, a control signal having a relatively large amplitude is needed to obtain a relatively small change in phase, particularly after a signal has been shifted in phase approximately one radian (57.3°). Contrast this to the frequency control method of phase control where the relation between the amount of phase shift and the amplitude of the control signal is linear, and the amplitude of the control signal to shift the phase of a signal a given amount is relatively small compared to the amplitude of the control signal of the phase shift method to provide an equal shift in phase.

The discussion hereinabove has been concerned with the description of the phase control loop to provide the desired predetermined phase relationship between the IF output signals of mixers 5 and 7 to enable inphase combining in combiner 11. The following discussion will point out how this phase control loop may be employed in a space diversity, frequency diversity, time diversity or angle diversity system. The primary difference between these diversity systems is the type of signals present in sources 1*a* and 2*a*.

Consider first a space diversity system. In this type of diversity system, a pair of antennas 14 and 15 are sufficiently spaced from each other to provide an effective path difference from a transmitting antenna to antennas 14 and 15 for a signal having the same frequency to thereby provide different fading characteristics. In the illustration of FIG. 1 for operation in a space diversity system, $f_A=f_B$ and antennas 14 and 15 are spaced by a number of wavelengths at the operating frequency of the system. The outputs of antennas 14 and 15 are respectively coupled to radio frequency amplifiers 16 and 17 by means of switches 18 and 19 having the illustrated position. The output of amplifier 16 is coupled to mixer 5 and the output of amplifier 17 is coupled to mixer 7 by means of switches 20 and 21 having the illustrated position. As pointed out above, for operation of our phase control circuit, the relation $$|f_A-f_{LO_A}|=|f_B-f_{LO_B}|=|f_{if}$$

must be met. Therefore, since $f_A=f_B$, then $f_{LO_A}=f_{LO_B}$. With this relationship met, the phase control circuit will operate as described above.

Now let us consider a frequency diversity system. In this type of diversity system it is required that the frequencies received, $f_A$ and $f_B$ be spaced a sufficient amount to be uncorrelated, that is, to have different fading characteristics. There is no requirement that two antennas, such as antennas 14 and 15, be employed, or that these antennas be spaced. The signals, $f_A$ and $f_B$, will be coupled from antenna 14 through switch 18 in the illustrated position to amplifier 16 which is tuned to be responsive to only the signal $f_A$. Likewise, the signals $f_A$ and $f_B$ are coupled from antenna 15 through switch 19 in the illustrated position to amplifier 17 which is tuned to be responsive to only the signal $f_B$. Alternately the signals $f_A$ and $f_B$ may be received by the single antenna 22 and coupled to amplifiers 16 and 17 through switches 18 and 19 when these switches are positioned to be connected to contacts 23 and 24, respectively.

Regardless of which arrangement is used to receive the signals $f_A$ and $f_B$, the output of amplifier 16 is an amplified version of signal $f_A$ and the output of amplifier 17 is an amplified version of signal $f_B$. The outputs of amplifiers 16 and 17 are coupled directly to their associated mixers 5 and 7. As before, the following relation, $|f_A-f_{LO_A}|=|f_B-f_{LO_B}|=|f_{if}$ must be met. This means that the frequency of the oscillatory signals, $f_{LO_A}$ and $f_{LO_B}$, produced by signal generating means 3 must be adjusted relative to their associated carrier frequencies, $f_A$ and $f_B$, to produce IF signals having the same frequency at the outputs of mixers 5 and 7. It is further desired but not necessarily limited thereto, that both the oscillatory outputs of signal generating means 3 have a frequency above or below both of the signals $f_A$ and $f_B$ so that the modulation on the resultant IF signal, $f_{if}$, be in the same direction. With proper adjustment of the oscillatory outputs of signal generating means 3, the IF output signals of mixers 5 and 7 will have the same frequency and will be operated on to maintain the desired phase relationship with respect to each other as described hereinabove.

The third diversity system to be considered is a time diversity system. In a time diversity system, the diversity signals are rendered uncorrelated by spacing them in time relative to each other. The manner of maintaining the time spaced signals in separate communication channels my be provided by employing carrier signals having closely spaced frequencies, the frequency spacing not being sufficient to provide diversity advantage, or by cross-polarization techniques. In those systems employing cross-polarization techniques, the frequencies $f_B$ and $f_A$ would be equal while in those time diversity systems employing frequency spacing to establish a communication path, frequency signals, $f_A$ and $f_B$ would have different values.

Regardless of how the time diversity signals are maintained in their communication paths, whether through polarization or frequency, the signals present at antennas 14 and 15 will include a signal $f_B$ and a signal $(f_A)_T$, the latter symbol being employed to indicate that the modulation of signal $f_A$ is delayed in time T with respect to the modulation of signal $f_B$. It is to be understood that both signals could be delayed in time, however, the relative time displacement is the important factor. The signals received by antennas 14 and 15 are coupled to the proper signal channel to thereby enable the signals to be placed in time coincidence in the receiving system. If the time diversity signals are separated on a frequency basis, the receiving portion of this receiving system would operate as described hereinabove with respect to a frequency diversity system and if the time diversity signals are separated by cross-polarization, one of antennas 14 and 15 would be a vertically polarized antenna responsive to, say $(f_A)_T$ which is vertically polarized, while the other antenna of antennas 14 and 15 would be a horizontally polarized antenna responsive to signal $f_B$ which would be horizontally polarized. Once the time diversity signals are applied to the proper signal channel of the receiving system, either by frequency separation or cross-polarization, they are placed in time coincidence by providing in one of the signal channels a time delay means 25 which is placed in operative relationship with the output of amplifier 17 by positioning switches 20 and 21 in a conductive relationship with contacts 26 and 27. In this manner, the RF signal coupled to mixers 5 and 7 are in time coincidence to be operated upon in mixers 5 and 7 by the oscillatory signals of signal generating means 3 to provide IF signals in each of the signal channels 1 and 2 having the same frequency. When the time diversity signals are separated by cross-polarization techniques, the oscillatory signals $f_{LO_A}$ and $f_{LO_B}$ will be equal since the signals $f_A$ and $f_B$ are equal. On the other hand, if a frequency technique is employed for signal separation, it will be necessary to adjust the oscillatory signals $f_{LO_A}$ and $f_{LO_B}$ relative to $f_A$ and $f_B$ to provide IF signals at the output of mixers 5 and 7 having the same frequency. Once the frequency equality of the IF signals at the output of mixers 5 and 7 is established the phase control loop operates as described hereinabove.

The fourth diversity system to be considered is an angle diversity system. In an angle diversity system, an antenna 28 which may include a parabolic reflector surface 29 and a plurality of horns 30 provide a plurality of narrow radiation beams intersecting their mates from a similar transmitting antenna array. Each of the beams carry a carrier signal having the same modulation thereon, the signals on the beams being rendered uncorrelated by the angular displacement between the beams of the radiation pattern. The confinement of a signal to a particular communication path as represented by the mating transmitting and receiving antenna radiation beams may be enhanced by employing different carrier frequencies although this is not a requirement to produce uncorrelated signals. Each receiving horn 30 is associated with its own signal channel by a direct connection between the receiving horns 30 and the signal channel as provided by switches 18 and 19 when positioned to be in contact with contacts 31 and 32, respectively. The outputs of amplifiers 16 and 17 are coupled to mixers 5 and 7 which in cooperation with the oscillatory signals for generating means 3 produces an IF signal at the output of each of mixers 5 and 7 having an identical frequency. Once the equality of frequency of the intermediate frequency signals is established the phase control loop will operate as described hereinabove.

An additional advantage accruing from the IF combining system of this invention is the ability of controlling the amplitude of the received signal to have a predetermined value at the combining point and, hence, control the ratio of the amplitudes of the signals of sources 1*a* and 2*a* to have a predetermined amplitude ratio at combiner 11. If it is desired that the ratio of the amplitude of the signals at the output of signal channels 1 and 2 being combined in combiner 11 equal the ratio of the amplitude of the signals $f_A$ and $f_B$, applied to the input of signal channels 1 and 2, it is required that the signal channels 1 and 2 are not overloaded since the overload would tend to make the signals in the signal channels 1 and 2 equal in amplitude, and, hence, will change the ratio of the amplitude of the signals in the signal channels 1 and 2. To assure no overload on the signal channels, the dynamic range of the signal channels 1 and 2 must be sufficient to meet the requirement of no overload for maintenance of the original input signal amplitude ratios. A second way of meeting this requirement is to employ a common automatic gain control (AGC) circuit to provide equal gain in signal channels 1 and 2 to thereby provide the ratio of the amplitude of the input signals to channels 1 and 2 at combiner 11. By closing switch arm 33 against contact 34, the output of combiner 11 is amplitude detected by the AGC detector 35 to provide a control signal proportional to the amplitude of the combined signal at the output of combiner 11. The control signal is coupled through switches 36 and 37 when closed respectively against contacts 38 and 39 to the IF amplifiers 9 and 10 for maintenance of the ratio of the amplitude of the received signals at the input to combiner 11. This action results in linear combining of the signals and provides a diversity improvement within approximately 1 db of the improvement obtainable with the ratio squared combiner heretofore employed in baseband combining systems provided the median amplitudes of the received signals do not differ by more than approximately 10 db. Thus, by employing the common AGC arrangement there is obtained a combining arrangement closely approximating that of the baseband ratio squared combiner without the problem of providing instantaneously equal signals and facilitating the derivation of a suitable control voltage, first, by eliminating the heretofore employed auxiliary noise amplifier loop having fail-safe problems and, second, deriving the control signal from the composite, combined signal. The combined signal is considerably smoother than the individual signals according to well known diversity statistics so that deep Rayleigh fades do not have to be followed by the AGC circuit, nor do multipath nulls, thereby reducing the required range of operation of the AGC circuit. The employment of the common AGC arrangement as depicted in FIG. 1 is inherently fail-safe in that, if a component fails in any channel, control is still retained by the stronger channel or channels and undesired noise is not exaggerated.

When the median amplitudes of the received signal do differ by more than approximately 10 db, it is preferable to employ ratio squared combining which has been previously utilized in only baseband combining systems. However, in accordance with this invention it is possible with the combining arrangement disclosed herein to provide an IF ratio squared combining system by utilizing gain control stages 40 and 41 in the signal channels 1 and 2, respectively, by appropriately positioning switches 42, 43, 44 and 45 in electrical coupling relation with contacts 46, 47, 48 and 49, respectively. The input to gain control stages 40 and 41 have their amplitudes sampled by amplitude detectors 50 and 51, respectively. The control signal output from detectors 50 and 51 are subtracted one from the other in differential AGC voltage source 52 to provide an AGC control signal proportional to the difference in amplitude of the signals coupled to the input of stages 40 and 41. This action thereby produces a differential control voltage to reduce gain in that signal channel having the weakest signal to thereby modify the ratio of the amplitude of the received signals to provide ratio squared combining in combiner 11 where the weaker signal is controlled to contribute a proportionally smaller amount of itself than does the stronger signal to the combined signal. The common AGC control voltage from the detector 35 still is employed in the ratio squared combining arrangement to maintain the amplitude of the combined output signal constant.

Hereinabove with reference to the action of the phase-lock loop, it has been stated that the action of this phase control arrangement is to maintain or lock the IF output signals of mixers 5 and 7 in a predetermined phase relationship to thereby permit the combining of these signals in combiner 11 substantially inphase. The predetermined phase relationship between the output signals of mixers 5 and 7 will depend to a great extent upon the configuration of combiner 11. If combiner 11 is an arrangement of resistors to add together the amplitudes of the signals applied thereto, the output signals of mixers 5 and 7 would preferably be inphase. Alternatively, the output signals of mixers 5 and 7 could be in any known phase relationship with an appropriate phase shift circuit being employed in one of the signal channels to dispose the output signals of mixers 5 and 7 inphase for inphase combining in the resistive network. This latter arrangement has the disadvantage over the former arrangement in that an additional component need be employed to render the signals inphase. Likewise, if the former arrangement is employed where the output signals of mixers 5 and 7 are inphase, the phase comparator 8 must be such as to produce zero control voltage upon occurrence of this inphase condition.

If on the other hand, combiner 11 is a hybrid type combiner circuit, such as described in the copending application, Serial No. 737,172, filed May 22, 1958, now Patent No. 2,975,275, assigned to the same assignee as the present application, the output signals of mixers 5 and 7 are preferably maintained in a 90 degree phase relationship and a phase shifting element is arranged in conjunction with the hybrid type combiner to adjust the phase of the input signals to the combiner for inphase addition therein. In this arrangement, phase comparator 8 would have to provide a zero control signal upon occurrence of the 90 degree phase relationship between the IF output signals of mixers 5 and 7.

FIGS. 2, 3 and 4 illustrate schematic diagrams in block form of alternative embodiments of the phase control portion of the receiving system of FIG. 1 disposed between lines *a—a* and *b—b*. The components of these alternative embodiments are intended to be substituted for the components of the phase control system of FIG. 1 with the components of FIGS. 2, 3 and 4 which function similarly to like components of FIG. 1 carrying the reference characters of the components of FIG. 1.

Referring to FIG. 2, the received signals are coupled to mixers 5 and 7 of channels 1 and 2, respectively, to be heterodyned therein by the oscillatory signals of signal generating means 3. In the arrangement of FIG. 2 the signal generating means 3 includes a fixed oscillator 53 to supply the oscillatory signal to mixer 7 and a variable oscillator 54 to supply the oscillatory signal to mixer 5. The frequency of the oscillatory signals from signal generating means 3 are adjusted relative to the frequency of the input signal coupled to mixers 5 and 7 to produce, as described hereinabove, IF signals at the output of mixers 5 and 7 having the same frequency for application to amplifiers 9 and 10 and, hence, to combiner 11. The signal output of mixer 5 is coupled through an amplifier 55, a limiter 56 and a limiter driver 57 to phase comparator 8. The output of mixer 7 is coupled through amplifier 58, limiter 59 and limiter driver 60 to phase comparator 8, the phase control means. As in FIG. 1, the phase comparator 8 is so designed to produce a zero control voltage when the output signals of mixers 5 and 7 are in a predetermined phase relationship and a positive or negative control voltage having a magnitude dependent upon the phase relation of the IF output signals of mixers 5 and 7 with respect to the predetermined phase relationship. The control signal output of phase comparator 8 is coupled to the variable oscillator 54 to adjust the phase thereof to maintain the desired phase relationship between the IF signal outputs of mixers 5 and 7. Amplifiers 55 and 58, limiters 56 and 59 and limiter drivers 57 and 60 employed in the control loop, as illustrated, are to assure ample signal amplitude for the phase comparator 8 even at times of severe fading to thereby enable phase control signal production at substantially all times.

The variable oscillator 54 may be of the same type as described hereinabove with respect to variable oscillator 4 of FIG. 1 while the fixed oscillator 53 may be the usual crystal controlled type of oscillator having an output of substantially constant frequency. It is recognized, of course, that the control signal in this arrangement causes the phase of one IF signal to be changed with respect to the fixed phase of the other IF signal and thus, only one oscillator is doing the phase control work rather than the two oscillators of FIG. 1.

Referring to FIG. 3, the phase control arrangement illustrated therein is substantially identical to the phase control arrangement of FIG. 1 and of course operates in the same manner. The difference between the phase control arrangement of FIG. 3 and that of FIG. 1 is the inclusion of amplifiers 55, 56 and 57 of FIG. 2 to couple the output of mixer 5 to phase comparator 8, the phase control means, and the amplifiers 58, limiters 59 and limiter driver 60 to couple the output signal of mixer 7 to phase comparator 8.

Referring to FIG. 4, the signal generating means 3 of the phase combining system is illustrated to include a single oscillator 61 operating at a fixed frequency and having two oscillatory signal outputs. One of the oscillatory signal outputs of oscillator 61 is coupled to phase modulator 62 and, hence to a frequency multiplier 63 to provide the oscillatory signal for mixer 5. The other oscillatory signal of oscillator 61 is coupled to a phase modulator 64 and, hence, to a frequency multiplier 65 to supply the oscillatory signal for mixer 7. Phase comparator 8, phase control means, is coupled directly to the output of mixers 5 and 7 or through the amplifier-limiter arrangement illustrated to compare the phase of the IF output signal of mixer 5 with the phase of the IF output signal of mixer 7 and produce a phase control signal proportional to the observed phase relation. The resultant control signal is coupled to signal generating means 3 to control the phase of the oscillatory signals coupled to mixers 5 and 7 by varying phase modulators 62 and 64 in a push-pull manner as illustrated to thereby bring about the desired phase relationship between the IF output signals of mixers 5 and 7. It is obvious that rather than the push-pull arrangement illustrated for phase control of the oscillatory signals coupled to mixers 5 and 7 it would be possible to control only a single one of phase modulators 62 and 64 in much the same manner as a single oscillator is controlled as illustrated in FIG. 2. The arrangement of FIG. 4 provides a further saving in equipment in that it is possible to operate the phase control arrangement of the diversity receiving system of this invention with only one oscillator, thereby resulting in the saving of at least one oscillator. It should be further noted that the multipliers 63 and 65 enable the achievement of oscillatory signals of different frequencies for coupling to mixers 5 and 7 to render the phase control arrangement of FIG. 4 compatible with the various diversity receiving systems described hereinabove in connection with FIG. 1, that is, to render the frequency of the IF signals of signal channels 1 and 2 equal.

It is worthy of note that the components of FIGS. 2, 3 and 4 are substituted for like components in FIG. 1 between lines *a—a* and *b—b* and that the description of the arrangement to control the amplitude ratios of the signals being combined relative to the amplitude ratio of the received signals apply also to the phase control arrangements illustrated in FIGS. 2, 3 and 4.

In the description hereinabove, the illustrations have been directed toward dual diversity receiving arrangements. It has been found that to increase the reliability of a forward scatter communication system, it is preferable to increase the number of received signals, or folds of diversity, to at least four to provide a quadruple diversity system. The tendency is not to employ only four folds of diversity but to employ, say twenty-eight or more substantially uncorrelated signals, or at least signals that are no more than 0.6 correlated, to provide diversity advantage with increased reliability. The techniques described hereinabove with respect to FIGS. 1 to 4, namely, the phase control loop and the control of the amplitude ratio of the received signals may readily be extended into multifold diversity systems employing three or more diversity signals. FIGURE 5 illustrates how the arrangements of FIGS. 1 to 4 may be incorporated in diversity receiving systems enabling the inphase combining of more than two diversity signals at IF while FIGS. 6 and 7 illustrate another embodiment of the phase control means of this invention that may be employed in dual diversity as well as multifold diversity receivers. The combining system of FIG. 7 has a particular advantage, described hereinbelow, over the other combining systems where more than four diversity signals are involved. All of these systems employ substantially the same techniques and function basically in the manner described hereinabove.

Referring to FIG. 5, there is illustrated therein a quadruple diversity system including two dual diversity receivers as illustrated in FIG. 1. A first dual diversity receiver 66 includes a pair of signal channels, such as signal channel 1 including mixer 5 and signal channel 2 including mixer 7. The output or radio frequency signals from any of the variations of sources 1a and 2a of FIG. 1 are coupled to respective ones of mixers 5 and 7. The oscillatory signals from signal generating means 3 coact in mixers 5 and 7 to produce IF signals having the same frequency. As in FIG. 1, the signal generating means 3 includes oscillators 4 and 6. The IF signal outputs of mixers 5 and 7 are coupled, respectively, through amplifiers 9 and 10 to combiner 11 to produce at the output thereof a single combined signal having diversity advantage. As set forth in FIG. 1, the phase lock between the intermediate frequency signals to provide the desired inphase combining in combiner 11 is produced by one portion of the phase control means, namely, phase comparator 8 which produces a control signal to adjust in a push-pull manner the phase of the oscillatory signals of oscillators 4 and 6 to thereby maintain the IF signals in signal channels 1 and 2 in a predetermined phase relationship. The quadruple diversity system of FIG. 5 further includes a second dual diversity receiver 67 including components similar to those of dual diversity receiver 66 immediately above described, the components of receiver 67 being indicated by the reference characters of the similar components of receiver 66 but followed by the letter "c." As in the case of receiver 66, the pair of signal channels 1c and 2c including mixers 5c and 7c are respectively coupled to signal sources similar to sources 1a and 2a illustrated in FIG. 1 depending upon the diversity technique being employed. Receiver 67 operates exactly as described hereinabove with respect to receiver 66 and the receiver of FIG. 1 to combine the IF signal outputs of mixers 5c and 7c to produce a single combined signal by the inphase combining of the IF signals in combiner 11c. The single combined outputs of combiners 11 and 11c are coupled to a third combiner 68 for inphase combining therein. The phase control means of this quadruple diversity receiver further includes as another component thereof a third phase comparator 69 coupled to the outputs of combiners 11 and 11c to produce a control signal related to the phase relation between the output signals of combiners 11 and 11c. The control signal of phase comparator 69 is coupled in a push-pull manner to phase comparators 8 and 8c to adjust the pair of signals combined in combiner 11 relative to the pair of signals combined in combiner 11c to thereby establish the desired phase relationship between the signal output of combiners 11 and 11c to enable the inphase combining of these signals in combiner 68. The output signal of combiner 68 is then coupled to the remainder of the receiver for demodulation purposes or to be combined with the signals of other diversity signal channels in much the same manner as described herein for the quadruple diversity system.

In summary, the phase control means of the signal combiner of FIG. 5 includes phase comparator 8 wherein the IF signal of one of channels 1 and 2 is a reference signal for the IF signal of the other of channels 1 and 2, phase comparator 8 wherein the IF signal of one of channels 1c and 2c is a reference signal for the IF signal of the other of channels 1c and 2c, and phase comparator 69 wherein the combined signal at the output of one of combiners 11 and 11c is a reference signal for the combined signal at the output of one of combiners 11 and 11c. Hence, the phase control means is coupled to the output of each of mixers 5, 7, 5c and 7c. The control signal at the output of comparator 69 adjusts the control signal at the output of phase comparators 8 and 8c, which in turn establish the desired phase relationship between the IF signals. Thus, the phase control means is also coupled to the signal generating means of the receiving system including signal generating means 3 and 3c.

The quadruple diversity receiving system of FIG. 5 includes as did the dual diversity system of FIG. 1, a means to control the ratio of the amplitude of the received signals either for linear combining or ratio squared combining by employing the common AGC arrangement including AGC detector 35 coupled to the output of combiner 68 to accomplish linear combining by maintaining equal gain in each of the signal channels by controlling the gain of amplifiers 9, 10, 9c and 10c when the appropriate switches are positioned for electrical coupling between the AGC circuit and the signal channels as described hereinabove with respect to FIG. 1. The ratio squared combining is obtained by employing the gain control stages 40 and 41 in the signal channels of receiver 66 and the gain control stages 40c and 41c in the signal channels of receiver 67 operated upon by the differential AGC circuits 70 and 71. Each of these arrangements in receivers 66 and 67 controls the amplitude and, hence, the amplitude ratio of the pair of signals coupled, respectively, to combiners 11 and 11c. A third such arrangement including gain control stages 72 and 73 coupled respectively to the output of combiner 11 through the proper positioning of switches 74 and 75 and the output of combiner 11c through the appropriate positioning of switches 76 and 77 and differential AGC circuit 78 control the amplitude of and, hence, the amplitude ratio of the output signals of combiners 11 and 11c prior to combining in combiner 68 in accordance with the ratio squared technique.

To obtain four substantially uncorrelated signals for quadruple diversity systems any one of the diversity techniques discussed above, or any combination thereof may be employed. For instance, receivers 66 and 67 may both be a space diversity receiving system with the operating frequency of receivers 66 and 67 being appropriately spaced to provide frequency diversity between the signals of the two space diversity receiving systems.

To extend the diversity receiving system of FIG. 5 for inphase combining of more diversity signals, it is necessary to pyramid the combiner connections. In other words, two more diversity signals would be coupled to two more signal channels for combining in the associated combiner with the resultant combined signal being combined with the combined signal at the output of combiner 68 in still another combiner. The pyramiding of combiners is satisfactory for a few folds of diversity, but as the folds are increased the signal loss occurring in each of the combiners increases until a point is reached which would overcome the advantages achieved by this type of diversity combining system.

Referring to FIG. 6, another quadruple diversity system is illustrated having substantially the same signal channel arrangement as illustrated in the system of FIG. 5. That is, the signal channels are paired and coupled to a single combiner to provide a single output for a dual diversity system. To illustrate the similarity between the receiving system of FIGS. 5 and 6 the same reference characters employed in FIG. 5 will be illustrated in FIG. 6. The structural difference between the quadruple diversity system of FIG. 5 and FIG. 6 is the manner in which the phase-lock between the IF signals at the output of mixers 5 and 7, 5c and 7c is accomplished. In previous phase control arrangements one channel signal was referenced against another channel signal to provide the desired phase-lock for inphase combining in the combiners. To reduce the complexity of requiring a phase comparator to compare the output signals at the output of the combiners of each of the dual diversity receivers to in turn control the operation of the phase comparator of each of the dual diversity receivers, it has been determined that the desired phase-lock may be obtained by employing the combined output signal as the reference signal against which the phase of each of the IF signals is compared to thereby enable the maintenance of the desired phase relationship between the IF signals of each pair of IF signals for inphase combining in combiners 11 and 11c and the desired phase relationship between each pair of IF signals for inphase combining of the combined output signals of combiners 11 and 11c in combiner 68. Hence, the phase control means includes phase comparators 79, 80, 81 and 82 coupled to the outputs of mixers 5, 7, 5c and 7c, respectively, and also to the output of combiner 68. Each of phase comparators 79, 80, 81 and 82 produces a phase control signal appropriate for its associated signal channel, the control signals being coupled to the appropriate portion of the system signal generating means including signal generating means 3 and 3c.

The operation of the signal combining system of FIG. 6 may be summarized as follows. The IF signals at the output of mixers 5 and 7 produced through the coaction of signal generating means 3 and the received diversity signal are coupled to combiner 11 for inphase addition therein to provide a single signal which is varying both in amplitude and phase. In a similar manner the IF signals at the output of mixers 5c and 7c are coupled to combiner 11c for inphase addition therein. The output signals of combiners 11 and 11c are coupled to combiner 68 to provide an output signal which is a combined composite of the four original signals. A portion of the output signal from combiner 68 is fed back to each of the individual signal channel phase comparators 79, 80, 81 and 82 as a phase reference for the adjustment of the phase of the IF output signals from the associated mixers. In the phase comparator, the IF signal on its associated signal channel is compared with the combined output signal to produce the phase control signal which is coupled to the appropriate portion of the system signal generating means, signal generating means 3 and 3c, for phase adjustment of the oscillatory signals coupled to the signal channel with which the phase comparator is associated, the phase adjustment of the oscillatory signals being accomplished, for instance, by the frequency adjustment of oscillators 4, 6, 4c and 6c included in signal generating means 3 and 3c. This phase adjustment of each of the intermediate frequency signals enables the inphase addition in combiners 11, 11c and 68. With this type of phase control means, the four phase comparators are referenced against the combined output signal to provide a control signal to correct the relative phase of the continuously varying received signals to maintain the necessary phase lock therebetween for inphase combining. Although the phase control means of FIG. 6 is slightly different in configuration, namely, in the manner in which the control signal is obtained by employing a different reference signal for the operation of the phase comparators, the technique of combining at IF levels is the same as described hereinabove with respect to FIGS. 1 to 5.

As before, the signals in the signal channels must not overload these signal channels and, hence, an AGC detector 35 is employed to detect a portion of the combined output to produce an AGC control signal for coupling to each of the IF amplifiers 9, 10, 9c and 10c to maintain the various IF signals at the point of combining proportional to the signals applied from the RF portion of the diversity receiver to the input of mixers 5, 7, 5c and 7c.

As in the arrangements of FIGS. 1 to 5, it is also possible to provide ratio squared combining by employing a differential AGC circuit arrangement operating in conjunction with gain control stages in each of the signal channels as described hereinabove and indicated in FIG. 6 by the signal ratio control circuits 83, 84 and 85.

The extension of this circuit to accommodate say 14 inputs as might be required in an angle diversity receiving system results in a combiner pyramid or "tree" as described hereinabove with respect to FIG. 5 and where the combiner is a hybrid type circuit there results a lossy combining arrangement.

Referring to FIG. 7, there is illustrated therein a predetection combining arrangement following the techniques described hereinabove employing the phase-lock circuitry which may be extended to combine any number of diversity signals without the necessity of employing the lossy combiner circuits of the previous quadruple or higher diversity arrangements and with a minimum amount of equipment. Each of the signal channels includes as in the previously described arrangements a mixer 86, a variable frequency oscillator 87 to produce an IF signal from the received diversity signal at the output of mixer 86, the frequency of the IF signal being rendered the same for all signal channels by proper adjustment of the frequency of the oscillators 87. If the frequency of the signal applied to the input of each of mixers 86 is the same, the frequency of the oscillatory signal of each oscillator 87 would be the same. If, however, the frequency of the signals applied to the input of each of mixers 86 is different, then the frequency of the oscillatory signal of each oscillator 87 must be different and appropriately adjusted to render the frequency of all the IF signals equal. The IF signal of each of the channels is further coupled to an IF amplifier 88 and, hence to a buffer amplifier 89 to a common output point illustrated to be a conductor 90. To provide the necessary phase control, a phase comparator 91 is included in each of the signal channels coupled to the output of mixer 88 and conductor 90. Each of phase comparators 91 operates to compare the phase of the IF signal of each of the channels relative to the phase of the combined output signal. In this arrangement the phase comparator 91 will produce a zero control voltage if the IF signal of each channel is inphase with the combined output signal and a negative or positive polarity control signal having a certain magnitude dependent upon the direction and amount of deviation of the phase of the IF signal with respect to the phase of the combined output signal. This control signal, as in the previous embodiments, operates upon the variable oscillator 87 to adjust the oscillatory signal coupled to mixer 86 to thereby in turn adjust the phase of the resultant IF signal at the output of mixer 86.

As in the previous arrangements a common AGC arrangement is employed to maintain an equal gain in the signal channels and thereby maintain the signal at the output of amplifier 89 proportional to the amplitude of the signal applied to the input of mixer 86 and, hence, maintain the amplitude ratio of the received signals for linear combining. The necessary AGC control signal is developed in AGC detector 35 coupled to conductor 90, the AGC control signal thereby having a value proportional to the amplitude of the combined signal.

Thus, to accommodate more than four diversity signals it is preferred to employ the receiving system of FIG. 7 to remove the loss imparted by the combiners of the previous arrangements and to reduce the amount of equipment as much as practical. To accomplish this end, therefore, the signal generating means includes each of the variable oscillators 87 with its associated oscillatory signal coupled to its associated mixer and the phase control means includes a phase comparator coupled to each of the signal channels with the phase of the IF signal of the signal channels being referenced against the phase of the combined output signal, the reference signal thereby including the IF signals of the other signal channels. Although there is a slight change in structural organization, the same fundamental principle is involved in the operation of the arrangement in FIG. 7 as was involved in FIGS. 1 to 6 described hereinabove.

The purpose of buffer amplifiers 89 is to isolate the individual channel signal input to phase comparators 91 from the resultant combined output of the plurality of signal channels at conductor 90.

While we have described above the principles of our invention in connection with specific apparatus, it is to be clearly understood that this description is made only by way of example and not as a limitation to the scope of our invention as set forth in the objects thereof and in the accompanying claims.

We claim:

1. A diversity receiving system comprising a plurality of sources of signals, the signals of each of said sources having random phase relation with respect to each other, a signal generating means to produce a plurality of oscillatory signals each associated with respectively ones of said sources, a plurality of heterodyne means each coupled to respective ones of said sources and its associated one of said oscillatory signals to produce an intermediate frequency signal at the output thereof, the intermediate frequency signals at the output of each of said heterodyne means having the same frequency, a phase control means responsive to said intermediate frequency signals coupled to the output of each of said heterodyne means and said signal generating means to frequency control at least one of said oscillatory signals for phase adjustment thereof to vary the phase relation of said intermediate frequency signals with respect to each other to maintain said intermediate frequency signals in a predetermined phase relationship, means coupled to the output of each of said heterodyne means to combine substantially inphase said intermediate frequency signals, and means coupled to the output of each of said heterodyne means to control in accordance with a predetermined relationship the amplitude of each of said intermediate frequency signals relative to the amplitude of the signal of the respective one of said sources of signals.

2. A system according to claim 1, wherein said signal generating means includes a variable frequency oscillator to produce each of said oscillatory signals and said phase control means is coupled to each of said variable frequency oscillators for frequency control thereof to adjust the phase of the oscillator output signals therefrom relative to each other.

3. A system according to claim 1, wherein said signal generating means includes a variable frequency oscillator to produce certain of said oscillatory signals and a fixed frequency oscillator to produce others of said oscillatory signals and said phase control means is coupled to said variable frequency oscillator for frequency control thereof to adjust the phase of the oscillatory output signal therefrom relative to the phase of the oscillatory signal at the output of said fixed oscillator.

4. A system according to claim 1, wherein said sources of signals include a first and second source of signals, said signal generating means produces a first oscillatory signal and a second oscillatory signal, said heterodyning means includes a first heterodyning means coupled to said first source of signals and said first oscillatory signal to produce aid intermediate frequency signal at the output thereof and a second heterodyning means coupled to said second source of signals and said second oscillatory signal to produce said intermediate frequency signal at the output thereof, and said phase control means includes a phase comparison means coupled to said signal generating means for said frequency control of at least one of said first and second oscillatory signals, a first circuit to couple the output of said first heterodyne means to said phase comparison means, and a second circuit to couple the output of said second heterodyne means to said phase comparison means, said first and second circuits each including an amplifier and amplitude limiter coupled in series relation with respect to each other.

5. A system according to claim 1, wherein said sources of signals include a first, second, third and fourth source of signals, said signal generating means produces a first, second, third and fourth oscillatory signal, said heterodyning means includes a first heterodyning means coupled to said first source of signals and said first oscillatory signal to produce said intermediate frequency signal at the output thereof, a second heterodyning means coupled to said second source of signals and said second oscillatory signal to produce said intermediate frequency signal at the output thereof, a third heterodyning means coupled to said third source of signals and said third oscillatory signal to produce said intermediate frequency signal at the output thereof, and a fourth heterodyning means coupled to said fourth source of signals and said fourth oscillatory signal to produce said intermediate frequency signal at the output thereof, said means to combining includes a first combiner coupled to the output of said first and second heterodyning means to combine substantially inphase said intermediate frequency signals at the outputs thereof, a second combiner coupled to the output of said third and fourth heterodyning means to combine substantially inphase said intermediate frequency signals at the outputs thereof, and a third combiner coupled to the output of said first and second combiner to combine substantially inphase said intermediate frequency signals at the outputs thereof, and said phase control means includes a first phase comparison means coupled to the outputs of said first and second heterodyning means and said signal generating means for said frequency control of at least one of said first and second oscillatory signals, a second phase comparison means coupled to the outputs of said third and fourth heterodyning means and said signal generating means for said frequency control of at least one of said third and fourth oscillatory signals, and a third phase comparison means coupled to the outputs of said first and second combiners and at least one of said first and second phase comparison means to cooperate in said frequency control.

6. A system according to claim 1, wherein said phase control means includes a plurality of phase comparison means each coupled to the output of an associated one of said heterodyning means and the output of said means to combine to produce a control signal proportional to the phase relationship of the associated one of said intermediate frequency signals and the output signal of said means to combine, and means to couple each of said control signals to said signal generating means for said frequency control of the associated one of said oscillatory signals.

7. A system according to claim 6, wherein said sources of signals include at least two pairs of signal sources, said heterodyning means includes a heterodyning means coupled to each of said signal sources, said signal generating means includes a variable frequency oscillator coupled to each of said heterodyning means to produce said oscillatory signals, said means to combine includes a first combiner coupled to the output of one pair of said heterodyning means to combine substantially inphase said intermediate frequency signal at the outputs thereof, a second combiner coupled to the output of the other pair of said heterodyning means to combine substantially inphase said intermediate frequency signal at the outputs thereof, and a third combiner coupled to the output of said first and second combiner to combine substantially inphase said intermediate frequency signals at the outputs thereof, and said phase comparison means are each coupled to the output of said third combiner.

8. A system according to claim 6, wherein said means to combine includes an isolation means coupled to the output of each of said heterodyning means and a conductor coupled to the output of each of said isolation means to combine said intermediate frequency signals substantially inphase, and said phase comparison means are each coupled to said conductor.

9. A system according to claim 1, wherein said amplitude control means includes an intermediate frequency amplifier coupled to the output of each of said heterodyne means, an amplitude detector coupled to the output of said combining means to produce a control signal proportional to the amplitude of the combined signal, and means to couple said control signal to each of said intermediate frequency amplifiers to maintain the amplitude of said intermediate frequency signals at said combining means directly proportional to the amplitude of the output signal of the respective one of said sources for linear combining of said intermediate frequency signals.

10. A system according to claim 9, wherein said signal generating means includes a variable frequency oscillator to produce each of said oscillatory signals and said phase control means is coupled to each of said variable frequency oscillators for frequency control thereof to adjust the phase of the oscillator output signals therefrom relative to each other.

11. A system according to claim 9, wherein said signal generating means includes a variable frequency oscillator to produce certain of said oscillatory signals and a fixed frequency oscillator to produce others of said oscillatory signals and said phase control means is coupled to said variable frequency oscillator for frequency control thereof to adjust the phase of the oscillatory output signal therefrom relative to the phase of the oscillatory signal at the output of said fixed oscillator.

12. A system according to claim 9, wherein said sources of signals include a first and second source of signals, said signal generating means produces a first oscillatory signal and a second oscillatory signal, said heterodyning means includes a first heterodyning means coupled to said first source of signals and said first oscillatory signal to produce said intermediate frequency signal at the output thereof and a second heterodyning means coupled to said second source of signals and said second oscillatory signal to produce said intermediate frequency signal at the output thereof, and said phase control means includes a phase comparison means coupled to said signal generating means for said frequency control of at least one of said first and second oscillatory signals, a first circuit to couple the output of said first heterodyne means to said phase comparison means, and a second circuit to couple the output of said second heterodyne means to said phase comparison means, said first and second circuits each including an amplifier and amplitude limiter coupled in series relation with respect to each other.

13. A system according to claim 9, wherein said sources of signals include a first, second, third and fourth source of signals, said signal generating means produces a first, second, third and fourth oscillatory signal, said heterodyning means includes a first heterodyning means coupled to said first source of signals and said first oscillatory signal to produce said intermediate frequency signal at the output thereor, a second heterodyning means coupled to said second source of signals and said second oscillatory signal to produce said intermediate frequency signal at the output thereof, a second heterodyning means coupled to said third source of signals and said third oscillatory signal to produce said intermediate frequency signal at the output thereof, and a fourth heterodyning means coupled to said fourth source of signals and said fourth oscillatory signal to produce said intermediate frequency signal at the output thereof, said means to combining includes a first combiner coupled to the output of said first and second heterodyning means to combine substantially inphase said intermediate frequency signals at the outputs thereof, a second combiner coupled to the output of said third and fourth heterodyning means to combine substantially inphase said intermediate frequency signals at the outputs thereof, and a third combiner coupled to the output of said first and second combiner to combine substantially inphase said intermediate frequency signals at the outputs thereof, and said phase control means includes a first phase comparison means coupled to the outputs of said first and second heterodyning means and said signal generating means for said frequency control of at least one of said first and second oscillatory signals, a second phase comparison means coupled to the outputs of said third and fourth heterodyning means and said signal generating means for said frequency control of at least one of said third and fourth oscillatory signals, and a third phase comparison means coupled to the outputs of said first and second combiners and at least one of said first and second phase comparison means to cooperate in said frequency control.

14. A system according to claim 9, wherein said phase control means includes a plurality of phase comparison means each coupled to the output of an associated one of said heterodyning means and the output of said means to combine to produce a control signal proportional to the phase relationship of the associated one of said intermediate frequency signals and the output signal of said means to combine, and means to couple each of said control signals to said signal generating means for said frequency control of the associated one of said oscillatory signals.

15. A system according to claim 14, wherein said sources of signals include at least two pairs of signal sources, said heterodyning means includes a heterodyning means coupled to each of said signal sources, said signal generating means includes a variable frequency oscillator coupled to each of said heterodyning means to produce said oscillatory signals, said means to combine includes a first combiner coupled to the output of one pair of said heterodyning means to combine substantially inphase said intermediate frequency signal at the outputs thereof, a second combiner coupled to the output of the other pair of said heterodyning means to combine substantially inphase said intermediate frequency signal at the outputs thereof, and a third combiner coupled to the output of said first and second combiner to combine substantially inphase said intermediate frequency signals at the outputs thereof, and said phase comparison means are each coupled to the output of said third combiner.

16. A system according to claim 14, wherein said means to combine includes an isolation means coupled to the output of each of said heterodyning means and a conductor coupled to the output of each of said isolation means to combine said intermediate frequency signals substantially inphase, and said phase comparison means are each coupled to said conductor.

17. A system according to claim 1, wherein said control means includes an intermediate frequency amplifier and a gain control stage coupled in tandem with respect to each other and the output of each of said heterodyne means, an amplitude detector coupled to the input of each of said gain control stages, a differential circuit coupled to the output of said amplitude detectors to produce a first control signal proportional to the difference in amplitude of said intermediate frequency signals, means to couple said first control signal to each of said gain control stages to control the amplitude of said intermediate frequency signals coupled to said combining means in accordance with a predetermined relationship with respect to the amplitude of the output signal of respective ones of said sources of signals to provide ratio squared combining of said intermediate frequency signals in said combining means, an amplitude detector coupled to the output of said combining means to produce a second control signal proportional to the amplitude of the combined signal, and means to couple said second control signal to each of said intermediate frequency amplifiers to maintain the combined signal at a constant amplitude.

18. A system according to claim 17, wherein said signal generating means includes a variable frequency oscillator to produce each of said oscillatory signals and said phase control means is coupled to each of said variable frequency oscillators for frequency control thereof to adjust the phase of the oscillator output signals therefrom relative to each other.

19. A system according to claim 17, wherein said signal generating means includes a variable frequency oscillator to produce certain of said oscillatory signals and a fixed frequency oscillator to produce others of said oscillatory signals and said phase control means is coupled to said variable frequency oscillator for frequency control thereof to adjust the phase of the oscillatory output signal therefrom relative to the phase of the oscillatory signal at the output of said fixed oscillator.

20. A system according to claim 17, wherein said sources of signals include a first and second source of signals, said signal generating means produces a first oscillatory signal and a second oscillatory signal, said heterodyning means include a first heterodyning means coupled to said first source of signals and said first oscillatory signal to produce said intermediate frequency signal at the output thereof and a second heterodyning means coupled to said second source of signals and said second oscillatory signal to produce said intermediate frequency signal at the output thereof, and said phase control means includes a phase comparison means coupled to said signal generating means for said frequency control of at least one of said first and second oscillatory signals, a first circuit to couple the output of said first heterodyne means to said phase comparison means, and a second circuit to couple the output of said second heterodyne means to said phase comparison means, said first and second circuits each including an amplifier and amplitude limiter coupled in series relation with respect to each other.

21. A system according to claim 17, wherein said sources of signals include a first, second, third and fourth source of signals, said signal generating means produces a first, second, third and fourth oscillatory signal, said heterodyning means includes a first heterodyning means coupled to said first source of signals and said first oscillatory signal to produce said intermediate frequency signal at the output thereof, a second heterodyning means coupled to said second source of signals and said second oscillatory signal to produce said intermediate frequency signal at the output thereof, a third heterodyning means coupled to said third source of signals and said third oscillatory signal to produce said intermediate frequency signal at the output thereof, and a fourth heterodyning means coupled to said fourth source of signals and said fourth oscillatory signal to produce said intermediate frequency signal at the output thereof, said means to combining includes a first combiner coupled to the output of said first and second heterodyning means to combine substantially inphase said intermediate frequency signals at the outputs thereof, a second combiner coupled to the output of said third and fourth heterodyning means to combine substantially inphase said intermediate frequency signals at the outputs thereof, and a third combiner coupled to the output of said first and second combiner to combine substantially inphase said intermediate frequency signals at the outputs thereof, and said phase control means includes a first phase comparison means coupled to the outputs of said first and second heterodyning means and said signal generating means for said frequency control of at least one of said first and second oscillatory signals, a second phase comparison means coupled to the outputs of said third and fourth heterodyning means and said signal generating means for said frequency control of at least one of said third and fourth oscillatory signals, and a third phase comparison means coupled to the outputs of said first and second combiners and at least one of said first and second phase comparison means to cooperate in said frequency control.

22. A system according to claim 17, wherein said phase control means includes a plurality of phase comparison means each coupled to the output of an associated one of said heterodyning means and the output of said means to combine to produce a control signal proportional to the phase relationship of the associated one of said intermediate frequency signals and the output signal of said means to combine, and means to couple each of said control signals to said signal generating means for said frequency control of the associated one of said oscillatory signals.

23. A system according to claim 22, wherein said sources of signals include at least two pairs of signal sources, said heterodyning means includes a heterodyning means coupled to each of said signal sources, said signal generating means includes a variable frequency oscillator coupled to each of said heterodyning means to produce said oscillatory signals, said means to combine includes a first combiner coupled to the output of one pair of said heterodyning means to combine substantially inphase said intermediate frequency signal at the outputs thereof, a second combiner coupled to the output of the other pair of said heterodyning means to combine substantially inphase said intermediate frequency signal at the outputs thereof, and a third combiner coupled to the output of said first and second combiner to combine substantially inphase said intermediate frequency signals at the outputs thereof, and said phase comparison means are each coupled to the output of said third combiner.

24. A diversity receiving system comprising a plurality of sources of signals, the signals of each of said sources having random phase relation with respect to each other, a signal generating means to produce a plurality of oscillatory signals each associated with respective ones of said sources, a plurality of heterodyne means each coupled to respective ones of said sources and its associated one of said oscillatory signals to produce an intermediate frequency signal at the output thereof, the intermediate frequency signals at the output of each of said heterodyne means having the same frequency, a phase control means responsive to said intermediate frequency signals coupled to the output of each of said heterodyne means and said signal generating means to frequency control at least one of said oscillatory signals for phase adjustment thereof relative to the other of said oscillatory signals to vary the phase relation of said intermediate frequency signals with respect to each other to maintain said intermediate frequency signals in a predetermined phase relationship, and means coupled to the output of each of said heterodyne means to combine said intermediate frequency signals substantially inphase, said signal generating means including a variable frequency oscillator to produce each of said oscillatory signals and said phase control means is coupled to each of said variable frequency oscillators for frequency control thereof to adjust the phase of the oscillatory output signals therefrom relative to each other.

25. A system according to claim 24, wherein said sources of signals include a first and second source of signals, said signal generating means includes a first variable frequency oscillator and a second variable frequency oscillator, said heterodyning means includes a first heterodyning means coupled to said first source of signals and said first oscillator to produce said intermediate frequency signal at the output thereof and a second heterodyning means coupled to said second source of signals and said second oscillator to produce said intermediate frequency signal at the output thereof, and said phase control means includes a phase comparison means coupled to said first and said second oscillators for said frequency control thereof, a first circuit to couple the output of said first heterodyne means to said phase comparison means, and a second circuit to couple the output of said second heterodyne means to said phase comparison means, said first and second circuits each including an amplifier and amplitude limiter coupled in series relation with respect to each other.

26. A system according to claim 24, wherein said sources of signals include a first, second, third and fourth source of signals, said signal generating means includes a first, second, third and fourth variable frequency oscillator, said heterodyning means includes a first heterodyning means coupled to said first source of signals and said first oscillator to produce said intermediate frequency signal at the output thereof, a second heterodyning means coupled to said second source of signals and said second oscillator to produce said intermediate frequency signal at the output thereof, a third heterodyning means coupled to said third source of signals and said third oscillator to produce said intermediate frequency signal at the output thereof, and a fourth heterodyning means coupled to said fourth source of signals and said fourth oscillator to produce said intermediate frequency signal at the output thereof, said means to combining includes a first combiner coupled to the output of said first and second heterodyning means to combine substantially inphase said intermediate frequency signals at the outputs thereof, a second combiner coupled to the output of said third and fourth heterodyning means to combine substantially inphase said intermediate frequency signals at the outputs thereof, and a third combiner coupled to the output of said first and second combiner to combine substantially inphase said intermediate frequency signals at the outputs thereof, and said phase control means includes a first phase comparison means coupled to the outputs of said first and second heterodyning means and said first and second oscillators for said frequency control thereof, a second phase comparison means coupled to the outputs of said third and fourth heterodyning means and said third and fourth oscillators for said frequency control thereof, and a third phase comparison means coupled to the outputs of said first and second combiners and at least one of said first and second phase comparison means to cooperate in said frequency control.

27. A system according to claim 24, wherein said phase control means includes a plurality of phase comparison means each coupled to the output of an associated one of said heterodyning means and the output of said means to combine to produce a control signal proportional to the phase relationship of the associated one of said intermediate frequency signals and the output signal of said means to combine, and means to couple each of said control signals to the associated one of said oscillators for said frequency control thereof.

28. A system according to claim 27, wherein said sources of signals include at least two pairs of signal sources, said heterodyning means includes a heterodyning means coupled to each of said signal sources, said signal generating means includes a variable frequency oscillator coupled to each of said heterodyning means, said means to combine includes a first combiner coupled to the output of one pair of said heterodyning means to combine substantially inphase said intermediate frequency signal at the outputs thereof, a second combiner coupled to the output of the other pair of said heterodyning means to combine substantially inphase said intermediate frequency signal at the outputs thereof, and a third combiner coupled to the output of said first and second combiner to combine substantially inphase said intermediate frequency signals at the outputs thereof, and said phase comparison means are each coupled to the output of said third combiner.

29. A system according to claim 27, wherein said means to combine includes an isolation means coupled to the output of each of said heterodyning means and a conductor coupled to the output of each of said isolation means to combine said intermediate frequency signals substantially inphase, and said phase comparison means are each coupled to said conductor.

References Cited by the Examiner

UNITED STATES PATENTS

| | | | |
|---|---|---|---|
| 2,042,831 | 6/36 | Crosby. | |
| 2,140,130 | 12/38 | Earp | 343—100 |
| 2,303,542 | 12/42 | Goddard. | |
| 2,349,407 | 5/44 | Crosby. | |
| 2,610,292 | 9/52 | Bond et al. | |
| 2,683,213 | 6/54 | Earp. | |
| 2,691,726 | 10/54 | Leypold. | |
| 2,786,133 | 3/57 | Dyke. | |
| 3,031,529 | 4/62 | Colodny | 179—15 |

FOREIGN PATENTS

| | | |
|---|---|---|
| 543,602 | 3/42 | Great Britain. |

OTHER REFERENCES

"Simplified Diversity Communication System for Beyond the Horizon Links," by Altman et al., pages 151–164 of Electrical Communications for June 1956.

"Diversity Reception of Tropospheric Scatter Signals in a Single Antenna," Aug. 9, 1957, R.C.A. Technical Notes No. 3.

Brennan: "Linear Diversity Combining Techniques," Proceedings of the I.R.E., pp. 1092–1093, June 1959.

ROBERT H. ROSE, *Primary Examiner.*

SAMUEL B. PRITCHARD, STEPHEN W. CAPELLI, DAVID G. REDINBAUGH, *Examiners.*